United States Patent [19]

Langan et al.

[11] Patent Number: 4,493,162

[45] Date of Patent: Jan. 15, 1985

[54] SEED COATING COMPOSITION AND METHOD

[75] Inventors: Ervin C. Langan, Atchison, Kans.; Howard W. Christie, Raytown, Mo.

[73] Assignee: W.E.F.C.O., Inc., Atchison, Kans.

[21] Appl. No.: 453,797

[22] Filed: Dec. 27, 1982

Related U.S. Application Data

[63] Continuation-in-part of Ser. No. 190,490, Sep. 24, 1980, abandoned, which is a continuation-in-part of Ser. No. 115,181, Jan. 25, 1980, abandoned, which is a continuation-in-part of Ser. No. 10,301, Feb. 8, 1979, abandoned, which is a continuation-in-part of Ser. No. 824,052, Aug. 12, 1977, abandoned.

[51] Int. Cl.$^3$ .............................................. A01C 1/06
[52] U.S. Cl. ................................................... 47/57.6
[58] Field of Search ......................................... 47/57.6

[56] References Cited

U.S. PATENT DOCUMENTS 3,545,129 12/1970 Schreiber et al. .................. 47/57.6
3,621,612 11/1971 Porter ............................. 47/57.6 X

*Primary Examiner*—Robert E. Bagwill
*Attorney, Agent, or Firm*—Schmidt, Johnson, Hovey & Williams

[57] ABSTRACT

A novel coating for crop seeds is disclosed which serves to delay germination of the seeds after planting thereof for significant periods of time (such as over the winter months), and thereafter allows germination and plant development in the normal manner. The preferred seed coatings include a relatively rigid, dried residue of a synthetic resin (e.g., an epoxide) which is filled with a material such as a hydrate former which slowly reacts with moisture from the earth and expands, so that the resin coating will rupture and allow seed germination when soil and climatic conditions are conducive to plant growth. It has also been discovered that a preferred precoating comprising methyl cellulose serves to enhance plant growth and hardiness, particularly in the period shortly after emergence.

12 Claims, No Drawings

SEED COATING COMPOSITION AND METHOD

This is a continuation-in-part of application Ser. No. 190,490, filed Sept. 24, 1980, which was a continuation-in-part of application Ser. No. 115,181, filed Jan. 25, 1980, which was a continuation of Ser. No. 10,301, filed Feb. 8, 1979, which was in turn a continuation of Ser. No. 824,052, filed Aug. 12, 1977 all abandoned.

This invention is concerned with a novel, germination-delaying coating which can be applied to crop seeds so as to significantly delay germination thereof when planted, particularly over the winter months so that seeds planted in the fall will germinate in the spring.

Generally speaking, germination of seeds requires suitable temperature, water and oxygen conditions (light is a factor in some seeds, but not cereals); all three factors must be present before viable seeds will germinate, and the absence of any one factor will prevent germination. Therefore, in theory at least, the coating of seeds to delay germination is a matter simply of excluding one of the necessary factors involved in seed germination. For example, a coating which prohibits exposure to moisture of fall planted seeds will prevent immediate germination of the seeds and subsequent plant death during the inhospitable winter months.

It is difficult if not impossible to specify beforehand the needed germination delay in terms of days or weeks. This is because soil temperature is influenced greatly by climate, local weather, soil type, soil cover, soil topography, and by interactions with other factors such as soil moisture. In short, the specific period of germination delay in terms of days or the like is unimportant, as long as germination is delayed sufficiently so that the emergent plants have a good chance of survival.

A number of attempts have been made in the past to provide a truly functional germination-delaying coating for crop seeds. As can be appreciated, a functional coating of this type would yield considerable advantages to the farmer in terms of increased production and lowered costs. However, prior coating systems have proven defective and have not achieved widespread use. Prior patents describing seed coatings and the like include U.S. Pat. Nos. 3,545,129, 3,621,612, 3,223,518, 2,579,733, and 2,736,139, and British Pat. No. 1,071,804.

It is therefore the most important object of the present invention to provide a coated crop seed which, when planted in the soil, will be delayed from germination and growth by virtue of the coating; in certain forms, the coating will be such as to provide a significant delay in germination, thus permitting fall planting of seeds and subsequent spring germination when factors of soil temperature and moisture are conducive to plant growth.

As a corollary to the foregoing, another object of the invention is to provide a coating on a crop seed which includes a relatively rigid, synthetic resin "substance" impregnated with a filler material which reacts with moisture from the soil and expands; the filler is present in an amount for slowly reacting with moisture with consequent expansion of the filler material, and, after a period of time, cracking or rupture of the coating in order to permit moisture to enter the seed to initiate germination thereof.

A still further object of the invention is to provide a synthetic resin seed coating wherein the resin is selected from the group consisting of the polyvinyl, polyester, phenolformaldehyde and epoxy resins, and wherein the filler material forms a hydrate with moisture from the earth and is selected from the group consisting of barium oxide, calcium oxide and calcium chloride.

Yet another aim of the invention is to enhance plant growth and viability, particularly in the stressful early periods after emergence by provision of a methyl cellulose coating (which may be a precoating before application of the synthetic resin material) serving to attract and hold moisture in the vicinity of the seed.

In one aspect, the present invention is concerned with a seed treated for delay in germination after planting thereof. Virtually any crop seed can be treated in accordance with the invention, and particularly crop seeds selected from the group consisting of corn, wheat, barley, sorghum (including milo), oats, rapeseed, beet, cotton, sunflower and soybean seeds. The basic coating system includes a relatively rigid substance which is the dried residue of a synthetic resin impregnated with a filler material. The filler slowly reacts with moisture and expands after planting of the coated seed. Filler is present in an amount for reacting with moisture from the earth after the seed is planted therein with consequent expansion of the filler material, and for causing the coating to rupture by virtue of the expansion of the filler material. This in turn allows the seed to absorb moisture and germinate in the usual fashion.

Preferably, the synthetic resin material is selected from the group consisting of the polyvinyl, polyester, phenol-formaldehyde and epoxy (particularly epoxide) resins. On the other hand, the filler material advantageously is of the type which forms a hydrate with moisture from the earth, and is selected from the group consisting of barium oxide, calcium oxide and calcium chloride. However, virtually any type of filler which reacts with moisture and expands is usable in the invention, and in this connection, the term "react" when used in connection with the filler material and moisture should be taken in a comprehensive sense, i.e., to include all types of physical, chemical and physical-chemical interactions between the filler material and moisture from the soil.

Preferably, the filler material is present at a level from about 5 to 60% by weight, based upon the weight of the dried syntheithic resin residue. More preferably, this level should be from about 25 to 40% by weight. Also, the selected synthetic resin material should have a relatively low molecular weight, of up to about 1,000.

In practice, the coating compositions hereof would normally include a selected synthetic resin and any necessary curing agents therefor (for example, in the case of an epoxide resin, a polyamide curing agent), along with a selected filler and solvent. Also, a coloring agent could also be added for purposes of identification. The coating composition can be applied to a selected crop seed by virtually any conventional method. Preferably however, the coating should be of relatively uniform thickness without regions of excess coating material. In practice though, it may be difficult or impossible to achieve true uniformity of coating over the entirety of the seed, and the present invention is therefore not limited in this regard. As an alternative, a controlled thickness coating over a significant portion of the seed can generally be accomplished and this is usually satisfactory. The thickness of the coating on the seeds is variable over a wide range however, depending principally upon the extent of the germination delay desired and local conditions. Those skilled in the art will appreciate that the thickness of the coating, taken with the nature of the coating material and the amount and type of filler, are factors to be considered in designing a coating for particular germination delay. In this regard, a coating thickness of about 0.5 to 10 thousandths of an inch would generally be suitable, and more preferably a thickness of about 2 to 5 thousandths of an inch.

The most preferred coating composition includes a relatively low molecular weight epoxide resin with a polyamide curing agent. The latter should have an amine value of from about 180 to 360, and the epoxide-polyamide mixture should contain from about 30 to 70% polyamide. The preferred filler material for use in this composition would be calcium oxide. A coloring agent such as iron oxide or titanium oxide can also be used, along with a minor amount of an organic solvent such as methyethylketone.

While in certain cases it may be desirable to directly coat the seeds with a synthetic resin composition of the type described, in other instances it may be advantageous to precoat the seed with an inert, elastic material. For example, the seeds can be precoated with a layer of a natural rubber which is biologically inert but yet bonds with the synthetic resin. The precoat is believed to serve as a sort of parting substance which prevents the relatively rigid synthetic resin material from entering the seed or otherwise disrupting the normal germination thereof. Also, should it be desirable, various functional agents such as anti-microbial compounds can be added to the coating (and especially the flexible precoating if used).

It has also been found that significant improvements are obtained using a precoating which comprises methyl cellulose. In fact, it has been discovered that the use of methyl cellulose alone serves to significantly enhance plant growth and hardiness, particularly in the stressful period shortly after plant emergence. It is believed that the methyl cellulose coating serves as a means to attract moisture in the vicinity of the seed, and thus facilitates seed viability and plant growth. Of course, use of methyl cellulose alone does not provide any germination delays, inasmuch as the material tends to take up moisture immediately.

The coated seeds in accordance with the present invention exhibit significant delays in germination from the time of planting thereof. In practice, the thickness of the coating, and the amount and type of the filler material therewithin, should be correlated for causing rupturing of the coating after from about 30 to 180 days from the time of planting, although greater or lesser time delays are possible. The timing of germination depends in large measure on prevailing weather conditions in an intended region of use, and also the thickness of the synthetic resin coating.

The following examples will describe coating crop seeds with a composition in accordance with the invention, and the plant test results derived therefrom. However, nothing in the examples is to be taken as a limitation upon the scope of the present invention.

EXAMPLE 1

A number of soybean seeds were coated with germination delaying synthetic resin coatings in accordance with the invention, and planted under field conditions to determine the effect of the coating. In all of the examples abbreviations have been employed to denote particular germination delaying synthetic resin coatings in accordance with the invention. In all of the examples treatment "L" refers to a treatment formulation including 8¾ parts by weight of Versamid 125 polyamide resin[1], 16¼ parts by weight Epon 828 epoxide resin[2], 39 parts by weight anhydrous calcium oxide, and 15 parts by weight methylethylketone solvent. The treatment coating system "M" refers to a formulation consisting of 8¾ parts by weight of Versamid 125 polyamide resin (Footnote 1), 16¼ parts by weight Epon 828 epoxide resin (Footnote 2), 26 parts by weight of adhydrous calcium oxide, and 12 parts by weight methylethylketone solvent. The number preceding the treatment designation stands for the number of coats applied.

[1]Sold by General Mills Chemicals, Inc., Minneapolis, Minnesota.
[2]Sold by Shell Chemical Company, Houston, Texas.

The soybeans in Example 1 were planted Jan. 29, 1982. The outside air temperature during the planting operations was approximately 37 degrees Fahrenheit, and slight precipitation was present. Sample 1 was a 250 seed lot size that was untreated and acted as a control. Sample 2 was a 250 seed lot size to which four coats of treatment "M" had been applied. Sample 3 again a 250 seed lot size, to which five coats of treatment "L" had been applied.

The results of the field testing of Example 1 are as depicted in Table I below. As can be seen from Table I, Sample 1 produced no emerging crops because of freeze kill. For Sample 2 90% of the seeds planted emerged with an average date of emergence of Apr. 16, 1982. For Sample 3 93% of the seeds planted emerged with an average emergence date of May 2, 1982.

TABLE I

| Sample No. | Number of Seeds | Treatment | Average Emergence Date | Number of Days After Planting for Average Emergence | Percent Emergence |
|---|---|---|---|---|---|
| 1 | 250 | Control | Freeze Killed | NA | 0 |
| 2 | 250 | 4M | 4/16/82 | 77 | 90 |
| 3 | 250 | 5L | 5/ 2/82 | 93 | 93 |

EXAMPLE 2

A number of corn seeds were coated with germination-delaying synthetic resin coatings in accordance with the invention, and planted under field conditions to determine the effect of the coating. The treatment notations are the same as for Example 1.

The seeds were planted Feb. 14 and 15, 1982 at a daily mean temperature of 42 degrees Fahrenheit. Sample 1 was untreated corn seed and served as a control. Sample 2 was treated with four coats "M", Sample 3 was treated with five coats "M", and Sample 4 was treated with five coats "L" formulation.

As seen from Table II the untreated control sample was freeze killed, while the other samples demonstrate good emergence. For Sample 2, 91 percent emerged with an average emergence date of Apr. 19, 1982. For Sample 3, 91 percent emerged with an average emergence date of May 6, 1982. For Sample 4, 78 percent emerged with an average emergence date of Apr. 3, 1982.

TABLE II

| Sample No. | Number of Seeds | Treatment | Average Emergence Date | Number of Days After Planting for Average Emergence | Percent Emergence |
|---|---|---|---|---|---|
| 1 | 72 | Control | Freeze Killed | NA | 0 |
| 2 | 96 | 4M | 4/19/82 | 63 | 91 |
| 3 | 96 | 5M | 5/ 6/82 | 80 | 91 |

TABLE II-continued

| Sample No. | Number of Seeds | Treatment | Average Emergence Date | Number of Days After Planting for Average Emergence | Percent Emergence |
|---|---|---|---|---|---|
| 4 | 96 | 5L | 4/3/82 | 48 | 78 |

EXAMPLE 3

A number of winter wheat seeds were coated with germination-delaying synthetic resin coatings in accordance with the invention, and planted under field conditions to determine the effect of the coating. The first three samples of wheat were planted Dec. 11, 1981 at an outside air temperature of 35° Fahrenheit. Sample 1 was treated with six coatings of "L" formulation, Sample 2 was treated with five coatings of "M" formulation, and Sample 3 was treated with six coatings of "M" formulation. Sample 4 was planted Oct. 24, 1981 and was treated with six coats of "M" formulation.

As may be appreciated the winter wheat demonstrated very good tolerance to the elements and a high percentage of emergence. For Sample 1, 98 percent emerged with an average emergence date of Mar. 14, 1982. For Sample 2, 98 percent emerged with an average emergence date of Mar. 15, 1982. For Sample 3, 100 percent emerged, with an average emergence date of Mar. 19, 1982. Sample 4 demonstrated 89% emergence with an average emergence date of Mar. 2, 1982. Sample 4 is significant in that it was planted about forty-seven days before the first three samples and yet emergence occurred only about fourteen days prior to the emergence of the first three samples.

TABLE III

| Sample No. | Number of Seeds | Treatment | Average Emergence Date | Number of Days After Planting for Average Emergence | Percent Emergence |
|---|---|---|---|---|---|
| 1 | 125 | 6L | 3/14/82 | 94 | 98 |
| 2 | 80 | 5M | 3/15/82 | 95 | 98 |
| 3 | 80 | 6M | 3/19/82 | 99 | 100 |
| 4 | 125 | 6M | 10/24/81-3/2/82 | 135 | 89 |

EXAMPLE 4

Spring wheat seeds were coated with germination-delaying synthetic resin coating in accordance with the invention, and planted under field conditions to determine the effect of the coating. Two samples were planted Jan. 29, 1982 at an outside air temperature of 37 degrees Fahrenheit and slight precipitation.

Sample 1 was treated with four coats of "M" formulation while Sample 2 was treated with five coats of "L" formulation. The spring wheat demonstrated surprising hardiness as demonstrated by the high percent of total energence shown in Table IV when coated in accordance with the invention. For Sample 1, 95 percent emerged with an average emergence date of Mar. 14, 1982. For Sample 2, 95 percent emerged, with an average emergence date of Mar. 14, 1982.

TABLE IV

| Sample No. | Number of Seeds | Treatment | Average Emergence Date | Number of Days After Planting for Average Emergence | Percent Emergence |
|---|---|---|---|---|---|
| 1 | 500 | 4M | 3/14/82 | 45 | 95 |

TABLE IV-continued

| Sample No. | Number of Seeds | Treatment | Average Emergence Date | Number of Days After Planting for Average Emergence | Percent Emergence |
|---|---|---|---|---|---|
| 2 | 500 | 5L | 3/14/82 | 45 | 95 |

EXAMPLE 5

In accordance with the invention a number of durum wheat seeds were coated with germination-delaying synthetic resin coating and planted under field conditions to determine the effect of the coating. The durum wheat was plated Feb. 14 and 15, 1982 at a mean outside air temperature of 42 degrees Fahrenheit.

Sample 1 was untreated and acted as a control. Sample 2 was treated with three coats of "M" formulation. Sample 3 was treated with four coats of "M" formulation, while Sample 4 was treated with six coats of "M" formulation.

Again the effects of the invention are demonstrated in Table V where it is noted that the control was freeze killed with no emergence. For Sample 2, 85 percent emerged with an average emergence date of Mar. 15, 1982. For Sample 3, 91 percent emerged with an average emergence date of Mar. 18, 1982. The results for Sample 4 were not as good as Samples 2 and 3, demonstrating 72 percent emergence with an average emergence date of Apr. 11, 1982.

TABLE V

| Sample No. | Number of Seeds | Treatment | Average Emergence Date | Number of Days After Planting for Average Emergence | Precent Emergence |
|---|---|---|---|---|---|
| 1 | 72 | Control | Freeze Killed | NA | 0 |
| 2 | 96 | 3M | 3/15/82 | 30 | 85 |
| 3 | 96 | 4M | 3/18/82 | 33 | 91 |
| 4 | 96 | 6M | 4/11/82 | 57 | 72 |

EXAMPLE 6

In another series of tests sunflower seeds were coated with germination-delaying synthetic resin coating in accordance with the invention, and planted under field conditions to determine the effect of the coating. The sunflower seeds were planted Dec. 9, 1981 at an approximate outside air temperature of 31 degrees Fahrenheit.

The treatment of the sunflower seeds was slightly different from the preceding examples. Sample 1 was initially treated with two coats of "L" formulation and then treated with four coats of "M" formulation. Sample 2 was treated with two coats "L" formulation and four coats of a formulation consisting of 8¾ parts by weight Versamid, 16¼ parts by weight Epon, 32 parts by weight calcium oxide and 13½ parts by weight methylethylketone. Sample 3 was treated with six coats of type "M" formulation.

The tests again show the good emergence characteristics of using the coating in accordance with the invention. For Sample 1, 87 percent emergence is shown, with an average emergence date of Mar. 21, 1982. For Sample 2, the percent emergence was 86 percent, and the average emergence date was Mar. 18, 1982. For Sample 3 showed a 98 percent emergence, with an average emergence date of Mar. 21, 1982.

TABLE VI

| Sample No. | Number of Seeds | Treatment | Average Emergence Date | Number of Days After Planting for Average Emergence | Percent Emergence |
| --- | --- | --- | --- | --- | --- |
| 1 | 125 | 2L, 4M | 3/21/82 | 101 | 87 |
| 2 | 125 | 2L, 4M | 3/18/82 | 98 | 86 |
| 3 | 250 | 6M | 3/21/82 | 101 | 98 |

We claim:

1. A seed treated for delay in germination after planting thereof, comprising:
   a crop seed;
   a coating on said seed for preventing normal germination of the seed for a period of time after planting thereof,
   said coating including the dried, relatively rigid and water insoluble residue of a synthetic resin, and a filler material admixed with and incorporated into said synthetic resin which reacts with moisture and expands, the amount of said resin and filler being correlated for preventing germination for said period of time, and with said filler being present in an amount for slowly reacting with moisture from the earth after said seed is planted therein with consequent expansion of the filler material, and for causing said coating to rupture after a period of time from the planting of said treated seed by virtue of said filler material expansion, in order to then allow said seed to germinate.

2. The treated seed as set forth in claim 1 wherein said crop seed is selected from the group consisting of corn, wheat, barley, sorghum, oats, rapeseed, beet, cotton, sunflower and soybean seeds.

3. The treated seed as set forth in claim 1 wherein said synthetic resin is selected from the group consisting of the polyvinyl, polyester, phenol-formaldehyde and epoxy resins.

4. The treated seed as set forth in claim 1 wherein said filler material is of a type which forms a hydrate with the moisture from the earth.

5. The treated seed as set forth in claim 4 wherein said filler material is selected from the group consisting of barium oxide, calcium oxide and calcium chloride.

6. The treated seed as set forth in claim 1 wherein said synthetic resin has a molecular weight of up to about 1000.

7. The treated seed as set forth in claim 1 wherein said synthetic resin comprises an epoxide with a polyamide curing agent.

8. The treated seed as set forth in claim 1 wherein said coating has a thickness of from about 0.5 to 10 thousandths of an inch.

9. The treated seed as set forth in claim 8 wherein said thickness is from about 2 to 5 thousandths of an inch.

10. The treated seed as set forth in claim 1 wherein said coating includes a biologically inert, elastic precoat layer in direct contact with said crop seed.

11. The treated seed as set forth in claim 1 wherein said precoat layer comprises a rubber.

12. The treated seed as set forth in claim 1 wherein said coating also includes an anti-microbial agent.

* * * * *